UNITED STATES PATENT OFFICE.

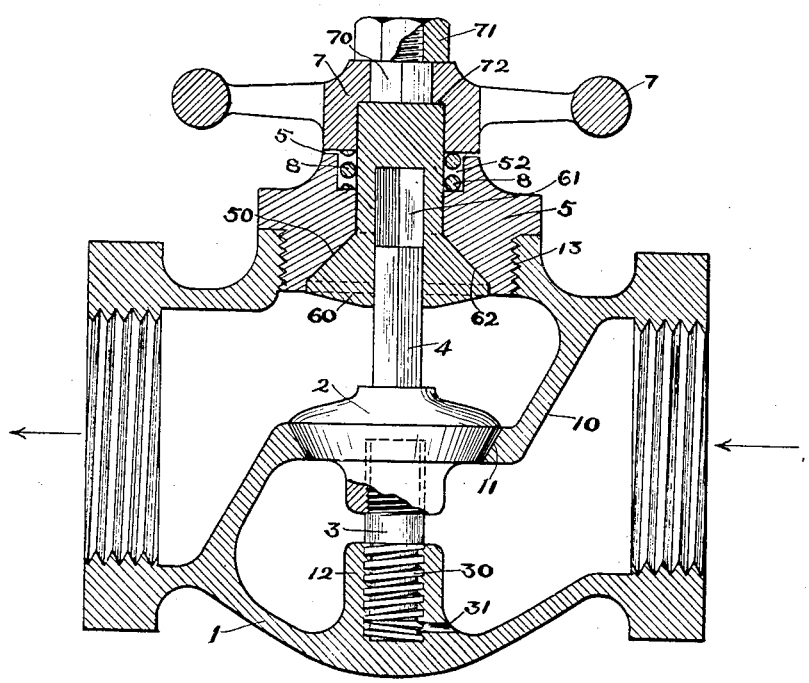

EDGAR J. CRAWFORD, OF SEATTLE, WASHINGTON.

VALVE.

1,376,745.     Specification of Letters Patent.     Patented May 3, 1921.

Application filed May 5, 1919. Serial No. 294,685.

*To all whom it may concern:*

Be it known that I, EDGAR J. CRAWFORD, a citizen of the United States, and resident of Seattle, King county, Washington, have invented certain new and useful Improvements in Valves, of which the following is a specification.

My invention relates to valves and consists of an improvement in valves whereby the opening through the casing of the valve through which it is operated to open and close it, is so constructed as to prevent leaking without having to pack any part thereof.

The object of my invention is to produce a convenient and reliable construction of valves whereby the use of packing material, to insure non-leaking, will be unnecessary.

The features of my invention which I deem to be new and which I wish to protect by Letters Patent will be hereinafter described and then particularly defined by the claim terminating this specification.

The accompanying drawing shows my invention constructed in accordance with the design which is preferred by me. This drawing shows a longitudinal section through the valve casing. The exterior casing 1 of the valves may be of any preferred type of construction which adapts itself to the use of the special features of my invention. The type of casing herein shown is that which is adapted for insertion within a straight line of pipe. This has a partition 10 extending across the same and dividing it into two chambers.

This partition is provided with an opening, the margin of which is adapted to act as a seat for the valve 2. As herein shown these seating surfaces, both of the valve and the partition 10, are conical in shape. This shape may, however, be varied. The shape should be of such character that the valve may be turned without affecting the close fitting of the same upon the partition, in other words, the seating surface should be a surface of revolution.

The valve is provided with two stems, one at each side thereof. One of these stems 3, has its end threaded, as shown at 30, and screws into a threaded boss or nut 12 which is integral with or carried by the valve casing. If the stem 3 be fixed to the valve 2, so that it must participate in the turning of the valve it is evident that turning of the valve will cause it to move lengthwise of its stem and thus be opened and closed. This stem 3 lies at the opposite side of the partition from that upon which the valve seats in closing. The lower part of the threaded recess into which the stem 3 screws is provided with a relief or drain outlet 31, so that any liquid which may collect therein, or which may be flowing through the valve, may move freely into and out of this recess. By removing the stem 3 from the valve it is obvious that the valve can be ground very readily which is one of the novel features of this construction.

The valve casing is provided with an opening 13 which is alined with the valve, so that the valve may be inserted therethrough and removed therefrom. This is closed by means of a bonnet 5, which has a stem screw threaded into the opening in the casing. This bonnet is provided with a central bore adapted to receive the stem of a sleeve or member 6 which is rotatively mounted therein, and which is engaged with the valve in such a manner that it may turn the valve without itself having any movement in the direction of the axis of the valve. In other words, it is enabled to turn the valve without partaking of the movement of the valve by which it is opened and closed. Normally the shank of this member 6 would be circular in section and the bore in the bonnet 5 would similarly be circular in section and fit snugly about the shank. This feature is, however, not an essential one, although in construction it would normally be adopted.

At its inner end this valve-turning member is provided with a head 60 which has a seating surface, as 62, adapted to closely fit against a complemental seating surface 50, forming a part of the bonnet 5. These two surfaces are analogous to the seating surface of the valve and valve seat and, in effect, form a sealing means to prevent leakage of the fluid contained in the valve casing. These surfaces should be surfaces of revolution, and while they are shown as being conical and I prefer to use conical surfaces, they might, however, be plane surfaces of revolution.

This valve operating member 6 extends from within the valve casing to without, and means are provided whereby the inner end thereof is enabled to turn the valve and, thus, to open and close the valve by the action of the threaded stem 3. Without the valve casing, it is provided with means by which it may be turned. Said means as herein shown, consists of a wheel or handle 7, which is secured thereto in such manner as to prevent turning, as for instance, by a terminal section 70 which is square or of other non-circular outline, the same fitting in a similarly shaped hole in the hand wheel 7. A nut 71 screwed upon the outer end serves to lock these together.

The means illustrated whereby the inner end of this member is secured to turn with the valve, and yet to permit relative axial movement between the two, consists in providing the operating member 6 with a socket or bore 61, and the valve with a stem 4, which in all positions of the valve enters this opening. If these two parts be non-circular in cross section the two are free to move axially and yet rotative movement may be communicated from one to the other.

I prefer to mount the valve operating member 6 in such manner that it is at all times given a minimum outward pressure against the seating surfaces 50 of its inclosing bonnet. I also prefer to do this in such a way that it is either impossible, or unlikely, that this pressure be made excessive.

A convenient way of doing this, which has been illustrated, consists in providing the outer face of the bonnet 5 with a recess 52 surrounding the shank of the operating member 6, and in this placing a spring 8 which holds the handle 7 and the operating member 6 outwardly. To prevent possible binding of these parts by tightening up the nuts 71 an excessive amount, I provide a shoulder, as 72, which binds upon the outer end of the shank 6 and cut down the upper surface of the bonnet 5, so as to leave a very slight clearance at the point 51. By doing this the normal pressure between the surfaces 50 and 62, when there is no pressure in the valve casing under the head 60, will be simply that which is produced by the spring. However, when a fluid under pressure is admitted to this side of the valve, this additional pressure will be exerted on the head 60 and assist in maintaining a tight joint.

The above valve is of simple construction and one which may be depended upon in operation. It will maintain at all times a tight joint and has no parts liable to excessive wear and deterioration.

What I claim as my invention is:

In combination, a valve case having a partition provided with a valve seat and an opening alined with said seat and adapted to permit passage of the valve, a valve adapted to said seat and having a stem at each side, the stem at the side which is opposite to said opening in the case being threaded and removably attached to the valve to permit grinding of the valve, a complementally threaded nut carried by the casing and receiving said threaded stem, a bonnet screwing into the said opening in the casing and having a bore alined with the other valve stem and surrounded on its inner face with a seating surface, a sleeve having a stem fitting said bore and a head having a complemental seating surface, said sleeve having a socket receiving the last mentioned stem and having an axially movable rotative connection with said valve stem, and means externally of the casing for turning said sleeve.

Signed at Seattle, Washington this 26th day of April 1919.

EDGAR J. CRAWFORD.